O. G. PAYNE.
CUTTING BOARD AND CLAMP.
APPLICATION FILED MAR. 4, 1910.
977,544.
Patented Dec. 6, 1910.
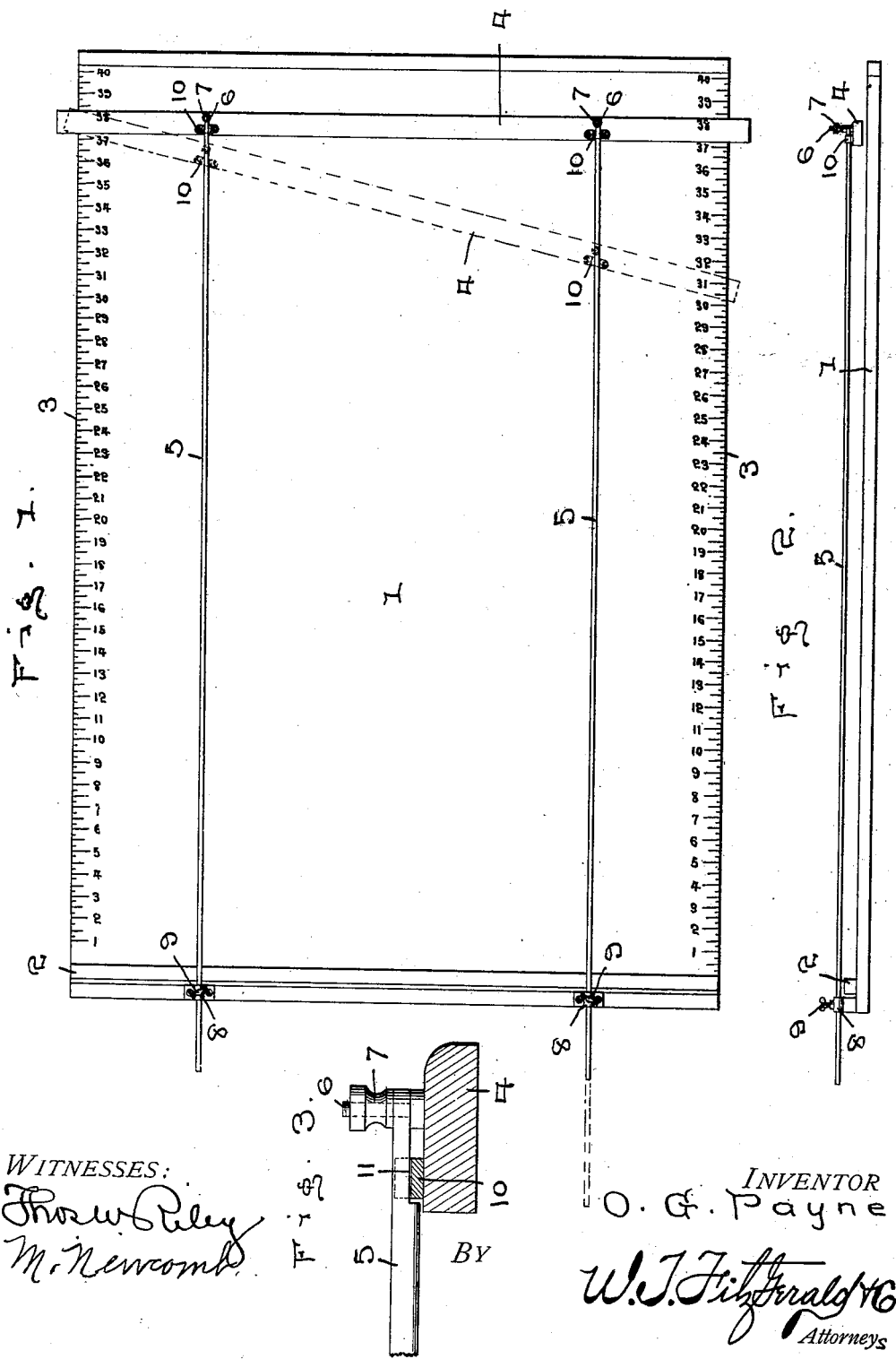
WITNESSES:
INVENTOR
O. G. Payne
BY
W. J. Fitzgerald
Attorneys

UNITED STATES PATENT OFFICE.

ORVIN G. PAYNE, OF FAIRBURY, ILLINOIS.

CUTTING-BOARD AND CLAMP.

977,544.  Specification of Letters Patent.  Patented Dec. 6, 1910.

Application filed March 4, 1910. Serial No. 547,336.

*To all whom it may concern:*

Be it known that I, ORVIN G. PAYNE, a citizen of the United States, residing at Fairbury, in the county of Livingston and State of Illinois, have invented certain new and useful Improvements in Cutting-Boards and Clamps; and I do hereby declare the following to be a full, clear, and exact description of the invention, such as will enable others skilled in the art to which it appertains to make and use the same.

My invention relates to new and useful improvements in measuring and cutting tables and is adapted more particularly to be used for cutting panes of glass and my object is to provide a base section upon which the glass is to rest while being cut, one end of the base having a shoulder thereon.

A further object is to provide a straight edge against which the cutting instrument is to be placed when cutting glass.

A further object is to provide means for adjustably disposing the straight edge over the table.

A further object is to so construct said adjusting mechanism that the glass can be cut at various angles, and, a further object is to provide suitable graduations along the edges of the table, whereby the straight edge may be quickly set for cutting purposes.

Other objects and advantages will be hereinafter referred to and more particularly pointed out in the specification and claims.

In the accompanying drawings which are made a part of this application, Figure 1 is a top plan view of the table in its operative position showing one position of the straight edge by dotted lines. Fig. 2 is an edge elevation thereof, and, Fig. 3 is a detail sectional view through the straight edge and its supporting means, said parts being shown on an enlarged scale.

Referring to the drawings in which similar reference numerals designate corresponding parts throughout the several views, 1 indicates the table, which may be constructed in the usual or any preferred manner, said table having a shoulder 2 adjacent one end thereof, said shoulder extending at right angles across the face of the table. Along each edge of the table are placed graduations 3, which graduations are preferably in inches and fractions thereof, whereby a piece of glass when resting upon said table may be readily measured. Disposed over the face of the table 1 is a straight edge 4, which extends entirely across the table and is supported by rods 5, said rods being pivotally secured to the straight edge by means of threaded studs 6, upon which are placed binding nuts 7. The rods 5 are disposed through sockets 8, which sockets are attached to the table 1 and at that end thereof containing the shoulder 2, binding screws 9 being disposed through said sockets to hold the rods in their adjusted positions. The rods 5 are normally held at right angles to the trend of the straight edge 4 by extending said bars over blocks 10 on the upper face of the straight edge, the upper faces of said blocks having notches 11 therein into which the rods 5 enter when extending at right angles to the straight edge.

If it is desired to extend the straight edge at an angle, as shown by dotted lines in Fig. 1, the nuts 7 are loosened and the rods 5 elevated until free of the notches 11, when the straight edge 4 may be swung to any desired angle and the nuts again clamped upon the ends of said rods, thus holding the straight edge in fixed relation with said rods. At the time of swinging the straight edge at an angle, one or both of the binding screws 9 are loosened so that the rods 5 may move longitudinally to properly adjust the straight edge and after the straight edge is adjusted, the binding screws are turned inwardly and on to the rods.

It frequently happens that the pressure required to prevent the straight edge from slipping during the cutting operation will break the glass in view of the unevenness of the surface upon which the glass is resting, but by using my improved device, it is not necessary to apply pressure on the straight edge, as the rods will serve to hold the straight edge in position.

This device may also be used for cutting straight edges on a piece of glass and extending the edges at right angles to each other even when the edges of the glass are uneven, which is accomplished by first trimming one of the edges straight and then alining said straight edge with one edge of the board or by placing the straight portion thereof against the shoulder 2. If the edges of the glass are at right angles to each other and it is desired to cut one of the edges at an angle, the glass is first positioned against the shoulder 2 and the straight edge placed at the proper angle across the glass, such angle being readily ascertained through the medium of the graduations, when by running a cutting device along the straight edge, the angular edge will be formed.

What I claim is:—

1. A device of the class described, comprising the combination with a table; of a straight edge disposed over said table, rods pivotally secured to said straight edge, means to positively lock said rods in a position at right angles to said straight edge, means to frictionally lock said rods in any other position, and means to adjustably secure said rods to the table.

2. In a device of the class described, the combination with a table having graduations along its edges and a shoulder adjacent one end; of a straight edge disposed over said table, rods adjustably secured to said straight edge, means to positively lock said rods in a position at right angles to said straight edge, means to frictionally lock said rods in any other position, and means to adjustably secure said rods to the table.

3. In a device of the class described, the combination with a table having graduations along its edges and a shoulder adjacent one end; of a straight edge disposed over said table, rods pivotally secured to said straight edge, blocks having notches therein to receive said rods, means whereby said rods may be clamped into said notches, thereby locking said rods at right angles to the straight edge, sockets on said table through which said rods extend, and binding screws adapted to hold said rods in their adjusted positions.

In testimony whereof I have signed my name to this specification in the presence of two subscribing witnesses.

ORVIN G. PAYNE.

Witnesses:
　THOMAS F. PAYNE,
　N. L. WANN.